E. L. LEFRANC.
DRIVE FOR CAM SHAFTS.
APPLICATION FILED AUG. 29, 1919.
1,334,659.
Patented Mar. 23, 1920.
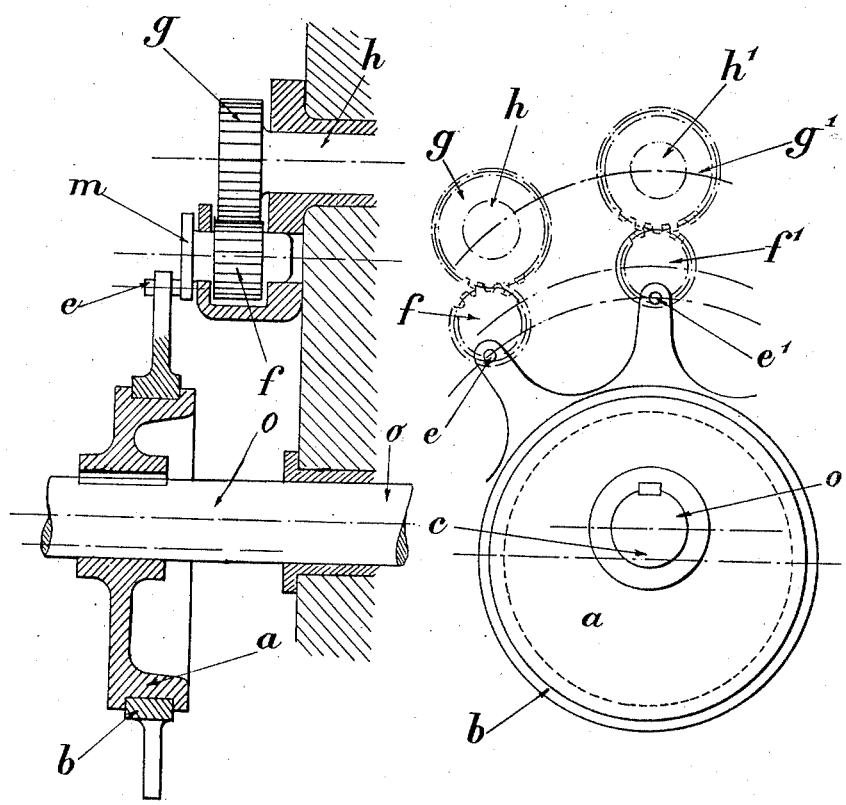
INVENTOR:
Eugène Louis Lefranc
By Wm Wallace White
ATT'Y.

UNITED STATES PATENT OFFICE.

EUGÈNE LOUIS LEFRANC, OF PARIS, FRANCE, ASSIGNOR TO SOCIETE DES MOTEURS GNOME ET RHONE, OF PARIS, FRANCE.

DRIVE FOR CAM-SHAFTS.

1,334,659.  Specification of Letters Patent.  Patented Mar. 23, 1920.

Application filed August 29, 1919. Serial No. 320,558.

*To all whom it may concern:*

Be it known that I, EUGÈNE LOUIS LEFRANC, citizen of the French Republic, residing at 41 Rue la Boëtie, Paris, in the Republic of France, have invented certain new and useful Improvements in Drives for Cam-Shafts, of which the following is a specification.

This invention relates to a drive for a number of cam shafts arranged star-fashion about one central driving shaft, this arrangement being specially adapted for use in star-like combustion engines, that is to say engines having radially arranged cylinders.

Said drive comprises essentially an eccentric disk keyed on the driving shaft and an eccentric strap loosely carried on said eccentric disk and connected to crank pins carried by the cam shafts or by gears which actuate said cam shafts.

In the annexed drawings, given by way of example:

Figure 1 is a partial longitudinal section of the drive.

Fig. 2 is a partial end view of the same certain parts being omitted.

An eccentric disk $a$ whose center is at $c$ is keyed on the central driving shaft $o$. On said eccentric disk, is loosely mounted an eccentric strap $b$ provided with radial arms which are respectively connected to crank pins $e$, $e^1$ . . . secured on crank plates $m$.

In the example shown the crank plates $m$ are operatively connected to the respective cam shafts $h$, $h^1$ . . . by speed reducing gears $f$ $g$, $f^1$ $g^1$ . . . which reduce the speed in the desired ratio, one half for instance.

When the driving shaft $o$ rotates, all the points of the eccentric strap describe circle having a radius equal to the eccentricity of the eccentric disk $a$ and the crank pins $e$, $e^1$ . . . in describing such circles actuate the crank plates $m$ which operate the cam shafts through the gears shown.

If the cam shafts should rotate at the same speed as the driving eccentric, the crank plates $m$ would be directly secured on the cam shafts and the driving eccentric $a$ would be actuated through any suitable speed reducing gear.

Having now described my invention what I claim as new and desire to secure by Letters Patent is:

1. A drive for cam shafts in star-like internal combustion engines comprising in combination a central driving shaft, cam shafts arranged around said central shaft means for rotatably supporting the central driving shaft and the cam shafts in relatively fixed positions, an eccentric disk keyed on the central shaft, an eccentric strap loosely carried on said eccentric disk, crank pins carried on said strap and means for operatively connecting said crank pins to the respective cam shafts.

2. A drive for cam shafts in star-like internal combustion engines comprising in combination a central driving shaft, cam shafts arranged around said central shaft, means for rotatably supporting the central driving shaft and the cam shafts in relatively fixed positions, an eccentric disk keyed on the central shaft, an eccentric strap loosely carried on said eccentric disk, crank pins carried on said strap, crank plates carrying said crank pins and speed reducing gears connecting said crank plates to the respective cam shafts.

In testimony whereof I have signed my name to this specification in the presence of a subscribing witness.

EUGÈNE LOUIS LEFRANC.

Witness:
CHAS. P. PRESSLY.